US012619094B2

(12) United States Patent
Lee et al.

(10) Patent No.: US 12,619,094 B2
(45) Date of Patent: May 5, 2026

(54) SYSTEMS AND METHODS FOR INCREASING DISPLAY SYSTEM FILL FACTOR

(71) Applicant: Meta Platforms Technologies, LLC, Menlo Park, CA (US)

(72) Inventors: Yun-Han Lee, Redmond, WA (US); Chulwoo Oh, Sammamish, WA (US); Hyunmin Song, Redmond, WA (US); Xinyu Zhu, San Jose, CA (US); Zhang Jia, San Jose, CA (US); Yongmin Park, Sammamish, WA (US); Jiawei Lu, Houston, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 301 days.

(21) Appl. No.: 18/522,130

(22) Filed: Nov. 28, 2023

(65) Prior Publication Data

US 2024/0231119 A1      Jul. 11, 2024

Related U.S. Application Data

(60) Provisional application No. 63/479,222, filed on Jan. 10, 2023.

(51) Int. Cl.
| | |
|---|---|
| *G02B 27/42* | (2006.01) |
| *G02B 7/09* | (2021.01) |
| *G02B 27/00* | (2006.01) |

(52) U.S. Cl.
CPC .......... *G02B 27/4216* (2013.01); *G02B 7/09* (2013.01); *G02B 27/0037* (2013.01)

(58) Field of Classification Search
None
See application file for complete search history.

(56) References Cited

U.S. PATENT DOCUMENTS

| | | | | |
|---|---|---|---|---|
| 5,543,942 A | * | 8/1996 | Mizuguchi | ....... B29D 11/00278 |
| | | | | 349/122 |
| 6,301,051 B1 | * | 10/2001 | Sankur | ................. G02B 3/0012 |
| | | | | 359/455 |
| 11,397,368 B1 | * | 7/2022 | Lu | ......................... G02B 26/106 |
| 2010/0309406 A1 | * | 12/2010 | Kim | ..................... G02B 3/0006 |
| | | | | 349/61 |
| 2017/0184848 A1 | * | 6/2017 | Vallius | ............... G02B 27/4261 |
| 2021/0349327 A1 | * | 11/2021 | Peng | .................. G02B 27/0172 |
| 2022/0269092 A1 | * | 8/2022 | Song | .................... G02B 5/3016 |

FOREIGN PATENT DOCUMENTS

| | | | | | |
|---|---|---|---|---|---|
| CN | 112074769 A | * | 12/2020 | ....... | G02F 1/133541 |
| KR | 20220120663 A | * | 8/2022 | ......... | G02B 27/0172 |

OTHER PUBLICATIONS

Zhi-Qiang Xie ("Two-dimensional optical edge detection based on Pancharatnam-Berry phase metasurface" Jan. 5, 2020, Acta Physica Sinica) (Year: 2020).*

* cited by examiner

*Primary Examiner* — Sharrief I Broome
*Assistant Examiner* — Journey F Sumlar
(74) *Attorney, Agent, or Firm* — Greenberg Traurig, LLP

(57) ABSTRACT

The disclosed system may include a display; a lens; and a diffractive optical element, where the diffractive optical element includes at least one Pancharatnam-Berry phase grating and is configured to increase a fill factor of the display when the lens is used to magnify the display. Various other apparatuses, systems, and methods are also disclosed.

14 Claims, 14 Drawing Sheets

1200

1206

1204

1208

1220   1222        1224  1226

1202

1216   1214

1204

1208

1230   1232  1234   1236   1238

System
1400

1402

1404

1406(B)

1406(A)

SYSTEMS AND METHODS FOR INCREASING DISPLAY SYSTEM FILL FACTOR

CROSS REFERENCE TO RELATED APPLICATION

This application claims the benefit of U.S. Provisional Application No. 63/479,222, filed 10 Jan. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
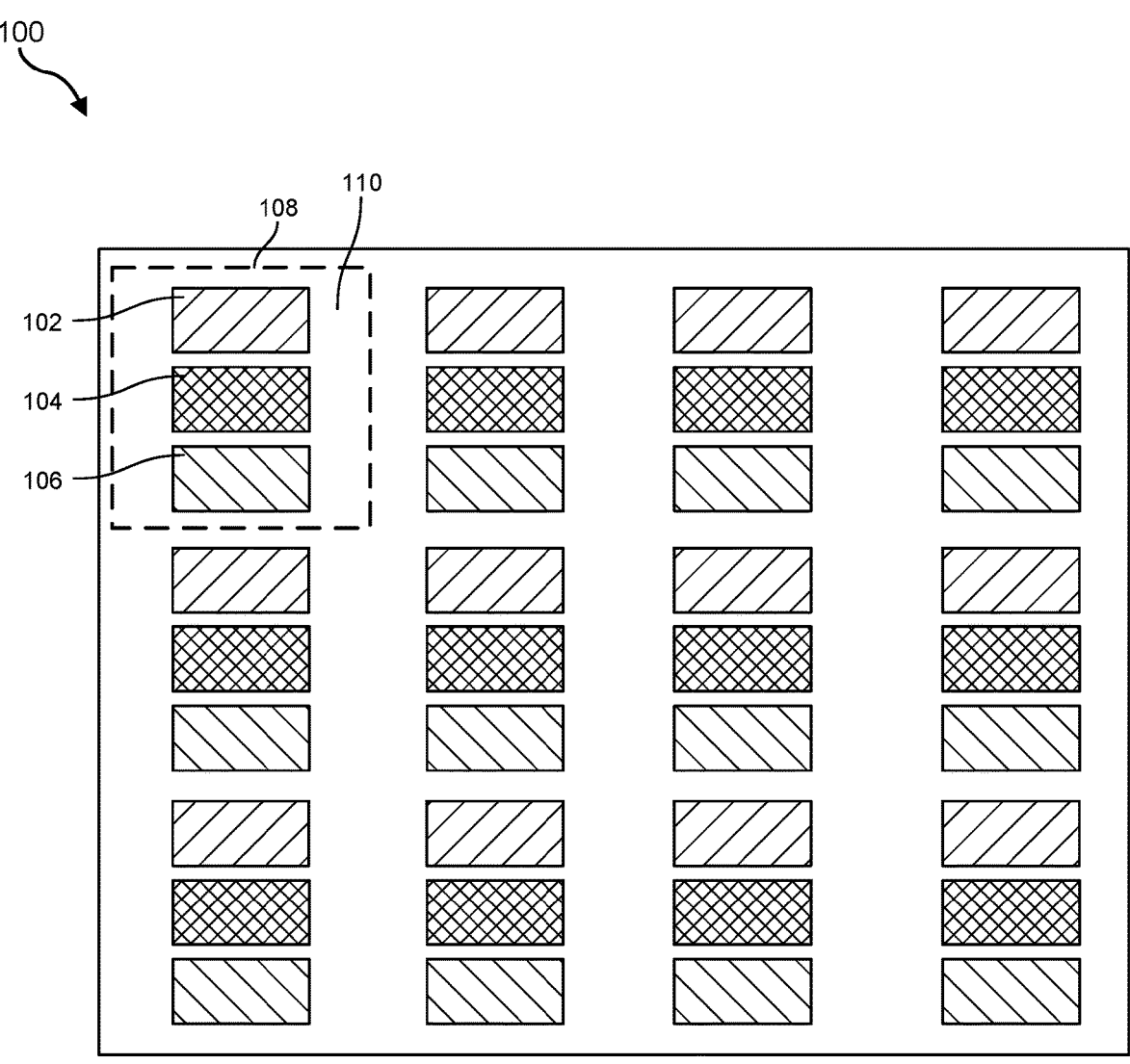
FIG. 1 illustrates an example display with an array of subpixels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

When a lens magnifies a display (as with a virtual reality system), gaps between pixels and/or subpixels may also be magnified, creating a "screen-door" effect of a visible dark grid. The screen-door effect may negatively impact perceived image quality, potentially resulting in a loss of sense of immersion (in the case of virtual reality or augmented reality system) or user dissatisfaction. To reduce or eliminate the screen-door effect, an optical element may precisely diffract images of pixels and/or subpixels into multiple images to increase their effective fill factor (e.g., reducing the area of the gaps). In some examples, a Pancharatnam-Berry phase (PBP) optical element may be adapted to perform the precise diffraction. The PBP element may be placed in a variety of places, including, e.g., near the lens (e.g., on the eye side). In some examples, two one-dimensional PBP gratings may be used-one to horizontally expand pixel images, another to vertically expand pixel images. In another example, a two-dimensional PBP grating may be used. Because different wavelengths may be affected differently by the PBP, in some examples multiple PBPs (e.g., one each for blue, green, and red) may be paired with corresponding color-selective waveplates.

By increasing the fill factor of magnified displays and reducing the screen-door effect, the apparatuses and systems described herein may improve the perceived image quality of magnified displays and, in the case of virtual reality and augmented reality systems, increase the users' sense of immersion.

Figure 11:
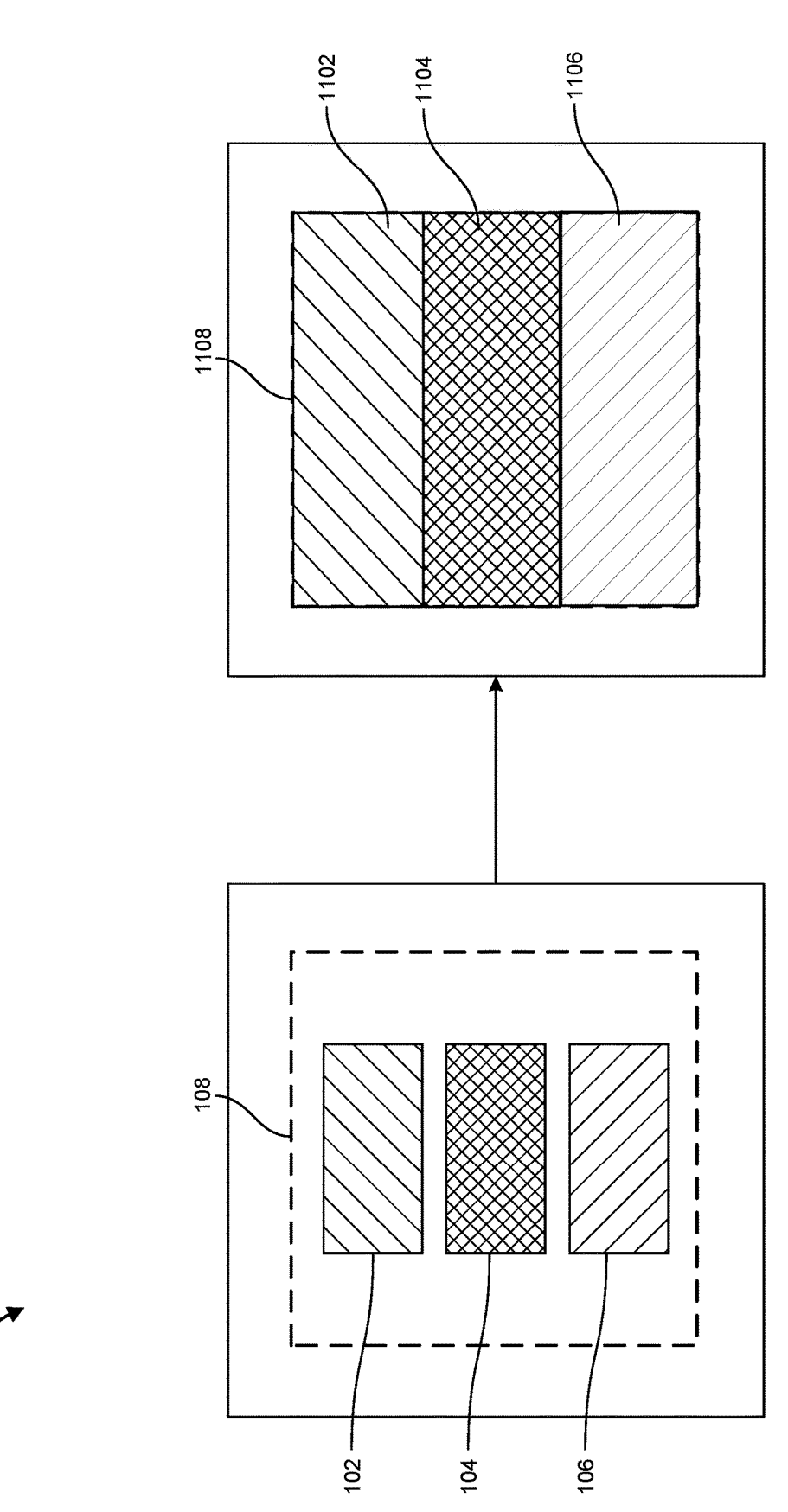
FIG. 11 illustrates an example fill factor increase of an example pixel.
Figure 12A:
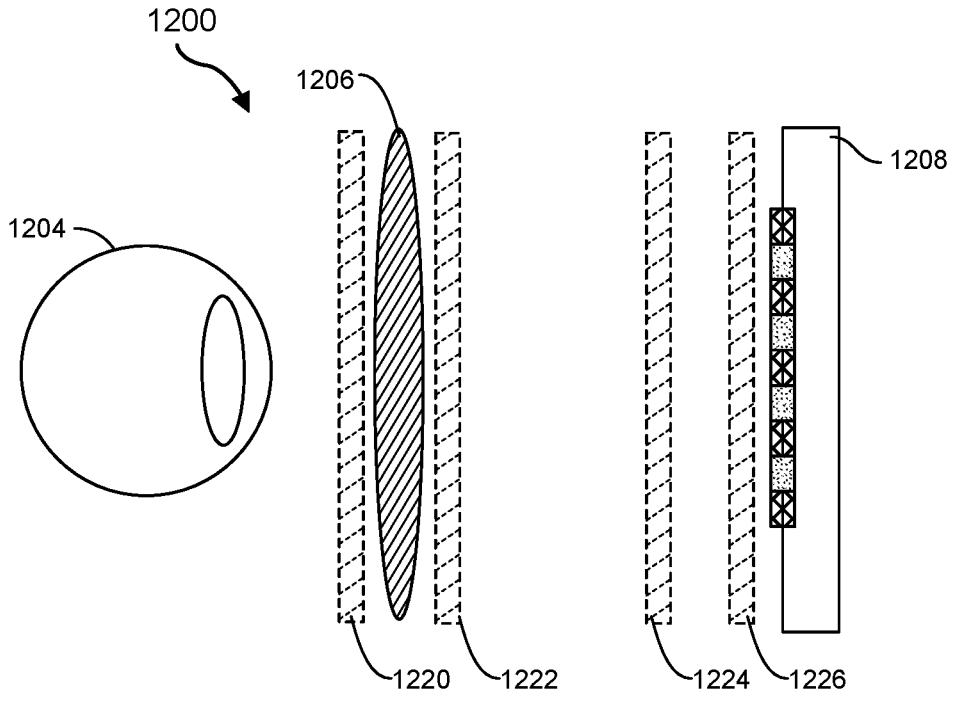
FIGS. 12A and 12B illustrate example placements of diffractive optical elements in display systems for increased fill factor.
Figure 12B:
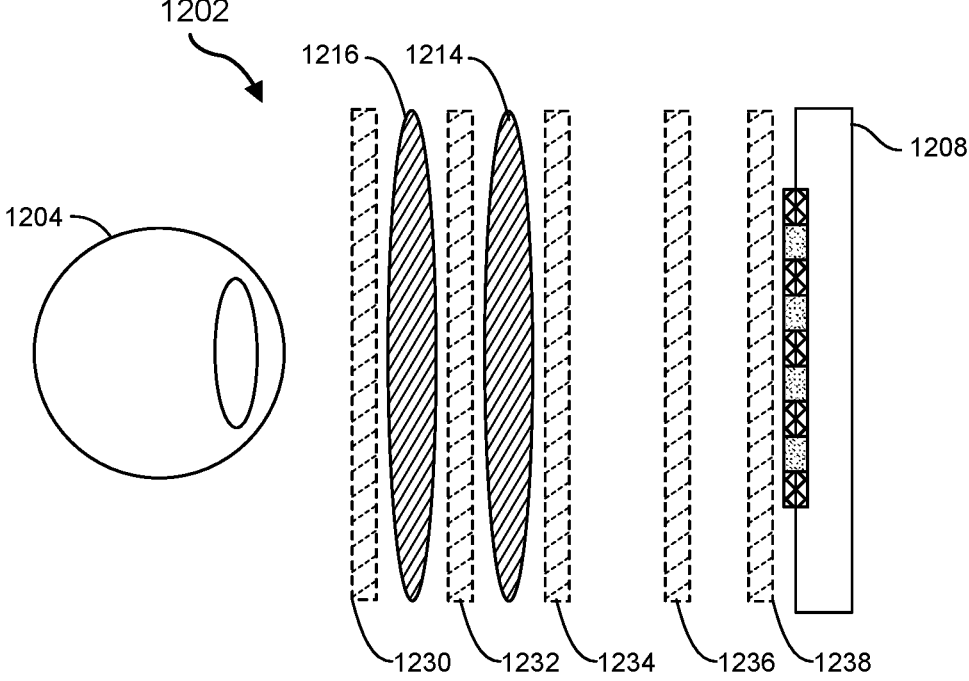
Figure 13:
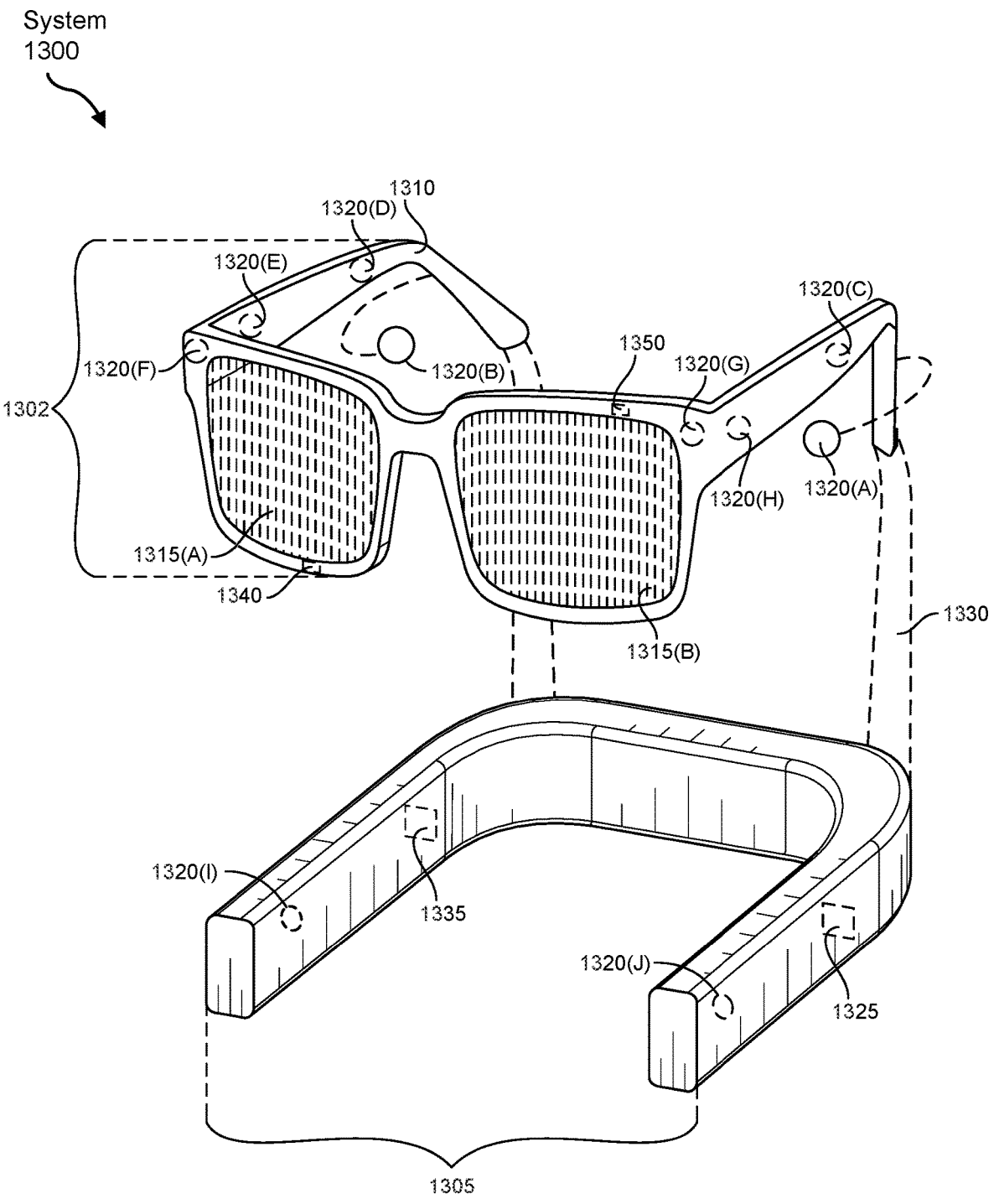
FIG. 13 is an illustration of exemplary augmented-reality glasses that may be used in connection with embodiments of this disclosure.
Figure 14:
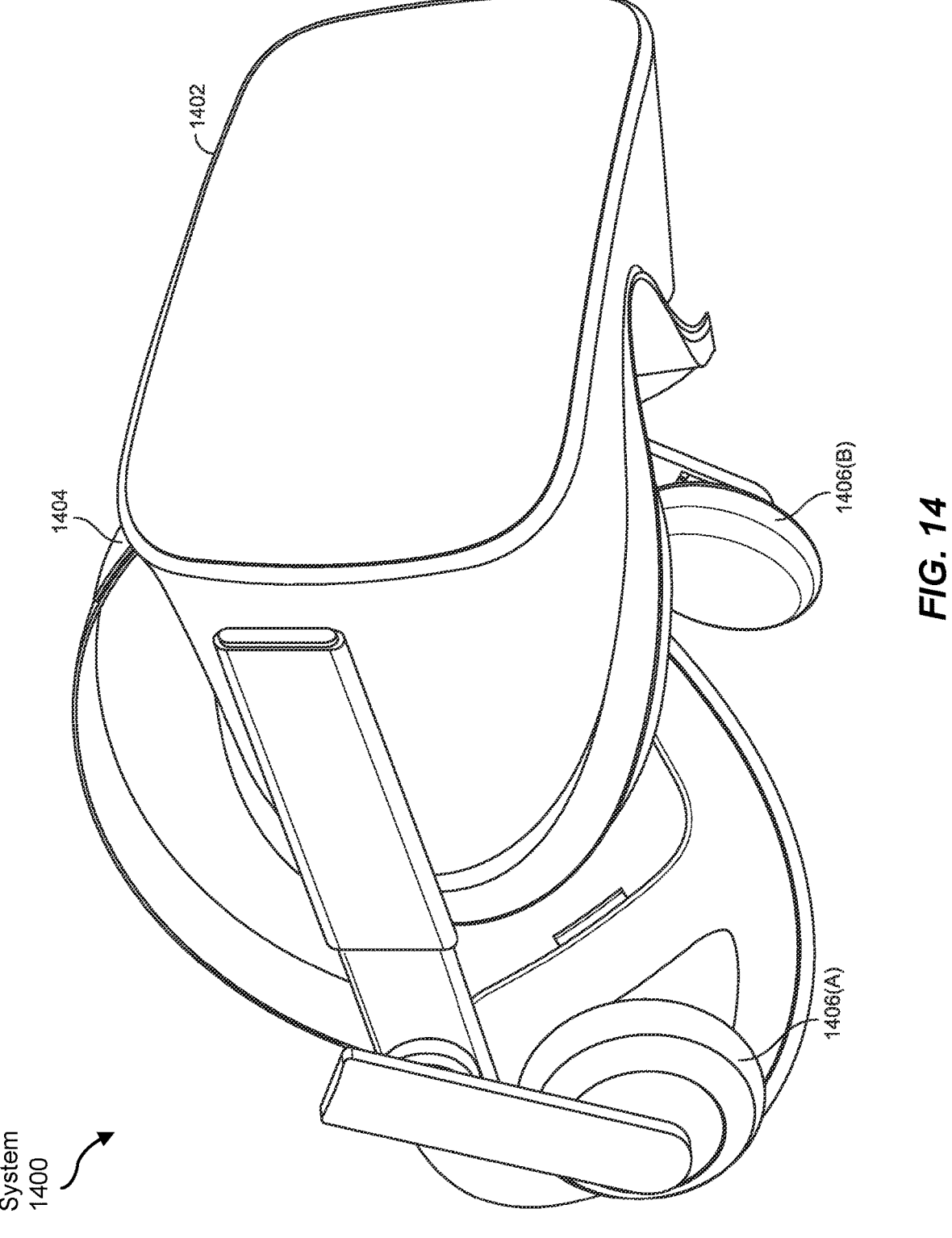
FIG. 14 is an illustration of an exemplary virtual-reality headset that may be used in connection with embodiments of this disclosure.

Detailed descriptions of example display systems will be provided in connection with FIGS. 1-5, 11, 12A, and 12B; detailed descriptions of example diffractive optical elements will be provided in connection with FIGS. 6-10; detailed descriptions of example virtual reality and augmented reality systems will be provided in connection with FIGS. 13-14.

FIG. 1 illustrates an example display 100 with an array of subpixels. As shown in FIG. 1, display 100 may include an array of pixels, including a pixel 108. Pixel 108 may include multiple subpixels, including a subpixel 102 (e.g., a blue subpixel), a subpixel 104 (e.g., a green subpixel), and a subpixel 106 (e.g., a red subpixel). As can be appreciated from FIG. 1, subpixels 102, 104, and 106 may leave a gap 110 between each other and between themselves and the subpixels of adjacent pixels. This gap, as repeated throughout display 100, may contribute to a screen-door effect—e.g., a perceptible black grid—in display 100, which may be made apparent and/or may become more intense when display 100 is magnified (e.g., by a lens).

Figure 2:
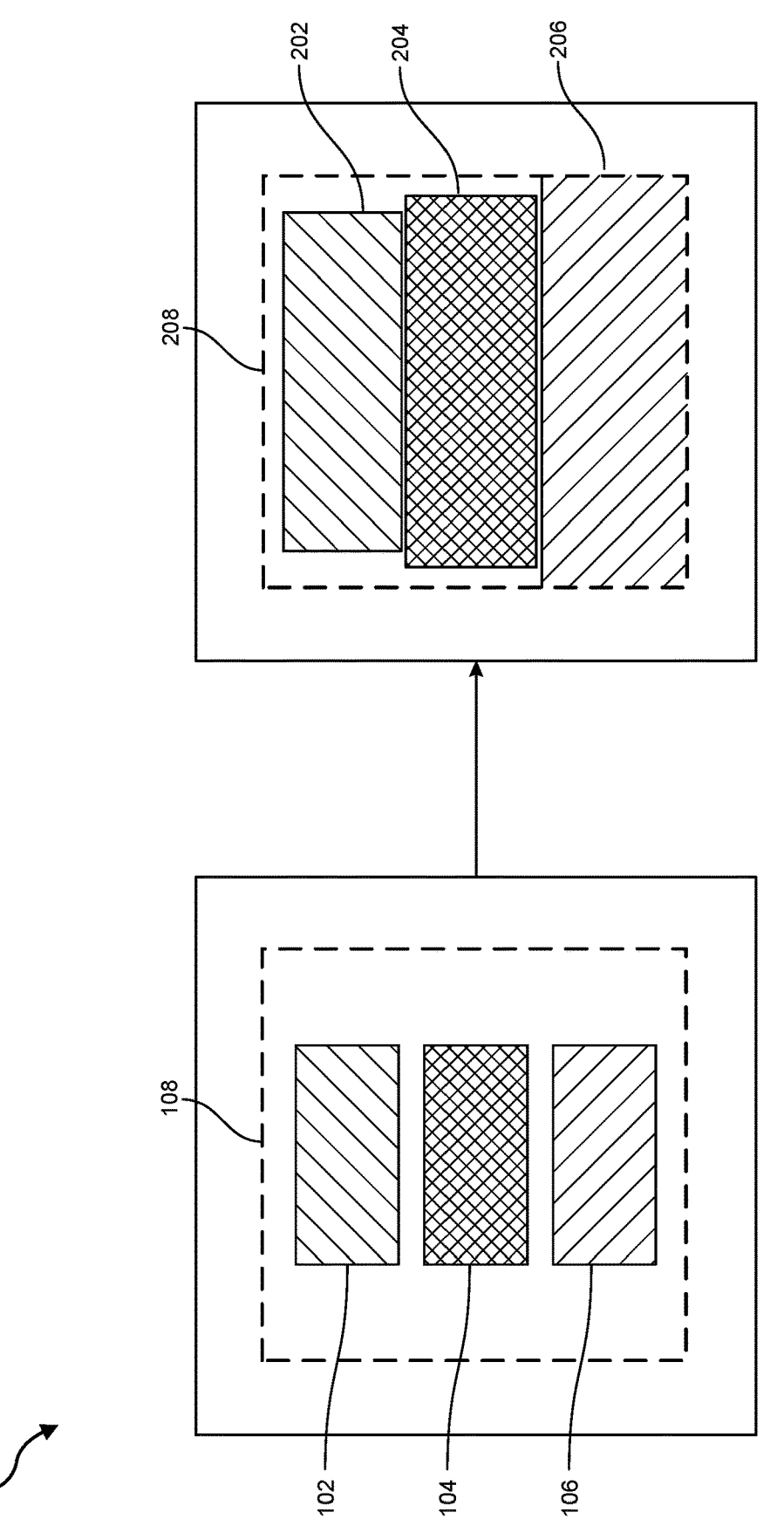
FIG. 2 illustrates an example fill factor increase of an example pixel.

FIG. 2 illustrates an example fill factor increase 200 of example pixel 108 of FIG. 1. As shown in FIG. 2, apparatuses and systems described herein may create an effective subpixel image 202 from subpixel 102, an effective subpixel image 204 from subpixel 104, and an effective subpixel image 206 from subpixel 106, resulting in an effective pixel image 208. For example, as mentioned above and as will be explained in greater detail below, subpixels 102, 104, and 106 may emit light of different wavelengths. Furthermore, a fill factor expansion device (that includes, e.g., a diffractive optical element) may disperse longer wavelengths more than shorter wavelengths. Accordingly, in one example, subpixel 106 may be expanded the most and subpixel 102 may be expanded the least. However, as will be discussed in greater detail below, in some examples the apparatuses and systems described herein may expand subpixels that emit light of different wavelengths evenly.

Because subpixel images 202, 204, and 206 leave less gap area between each other and between themselves and adjacent pixels, the screen-door effect may be mitigated and/or eliminated to a user's perception.

Figure 3:
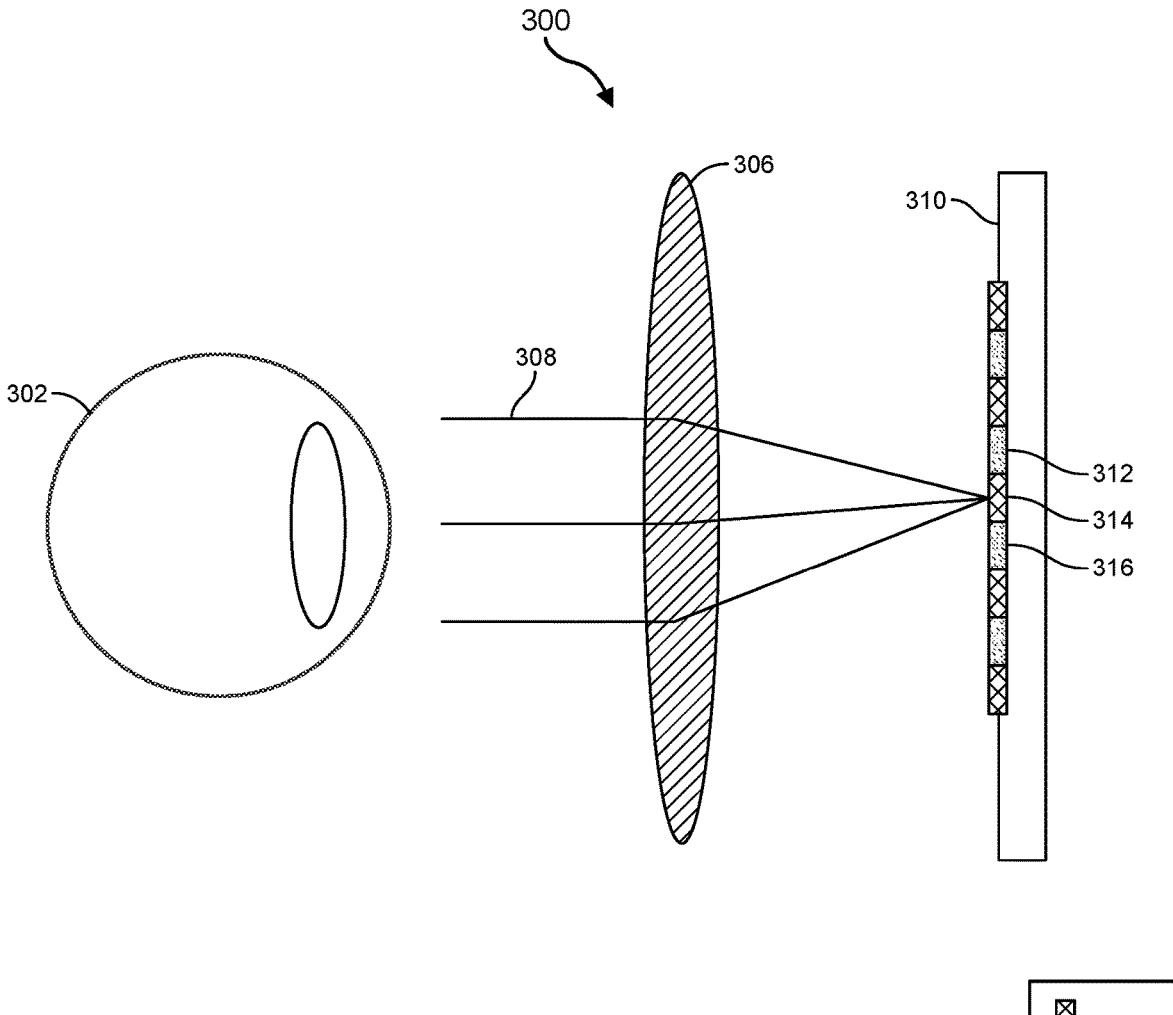
FIG. 3 illustrates an example display system.

FIG. 3 illustrates an example display system 300. As shown in FIG. 3, display system 300 may include a display 310. Display system 300 may include pixels, such as a pixel

3

314. Display system 300 may also include gaps between pixels, such as a gap 312 and a gap 316. In one example, light from display system 300 may be linearly polarized.

In various examples, light from display system 300, including, e.g., pixel 314, may pass through a lens 306. In some examples, rays 308 from pixel 314 may be collimated (e.g., mapped to angular space) after passing through lens 306. User eye 302 may perceive dark areas corresponding to gaps between pixels, such as gaps 312 and 316, as a dark grid (e.g., the screen door effect).

Although the example of FIG. 3 relates to pixels, it may be appreciated that similar principles may apply to subpixels. Thus, pixel 314 could instead be interpreted as a subpixel, and gaps 312 and 316 could be interpreted as gaps between subpixels and/or gaps between subpixels and pixels.

Figure 4:
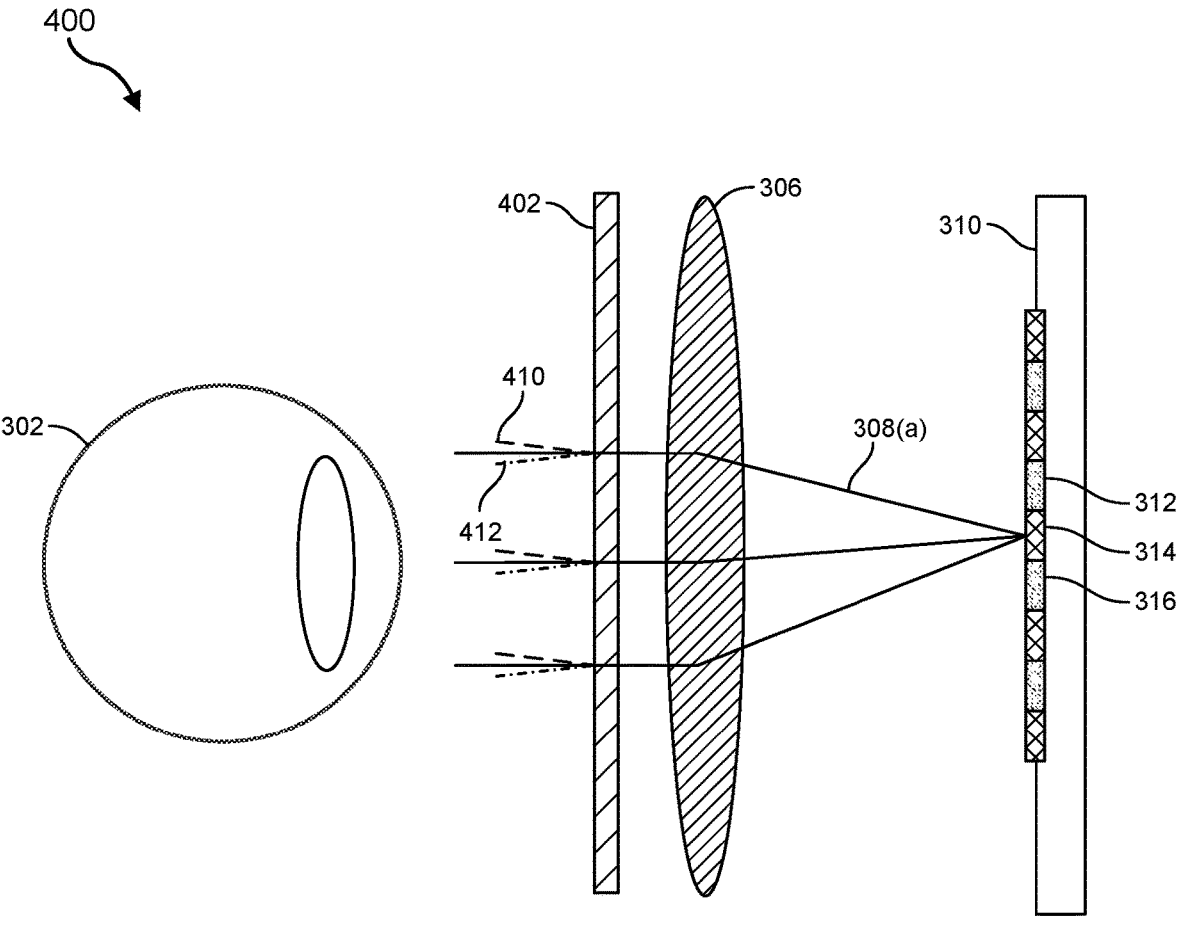
FIG. 4 illustrates an example display system with increased fill factor.

FIG. 4 illustrates an example display system 400 with increased fill factor. As shown in FIG. 4, display system 400 may include the elements of display system 300 and, in addition, a diffractive optical element 402. When a ray 308(*a*) passes through diffractive optical element 402, ray 308(*a*) may be split, resulting in a ray 410 and a ray 412. As will be explained in greater detail below, rays 410 and 412, along with ray 308(*a*) along its original path, may produce a virtual image of pixel 314 that appears to eliminate part or all of gaps 312 and 316 and thereby mitigate or eliminate the perceived screen door effect.

Figure 5:
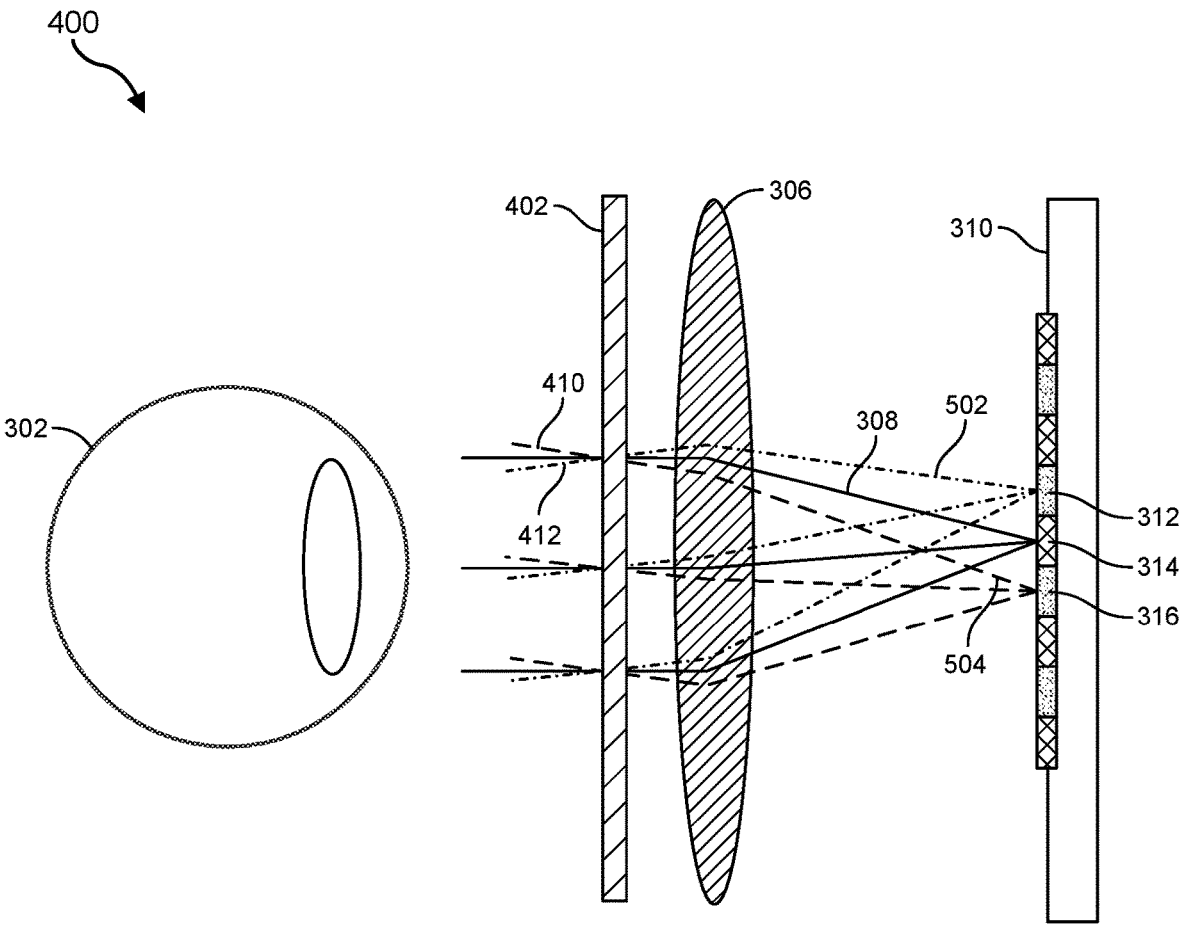
FIG. 5 illustrates virtual rays created by the display system with increased fill factor of FIG. 4.

FIG. 5 illustrates virtual rays created by display system 400 from FIG. 4, resulting in an increased apparent fill factor for user eye 302. As shown in FIG. 5, diffracted rays 410 and 412 may, when traced backward through lens 306 to display 310, correspond to virtual rays 504 and 502, respectively, which may appear to originate from gaps 316 and 312, respectively. Accordingly, to the perception of user eye 302, the screen door effect may be mitigated or eliminated in display system 400.

Figure 6:
FIG. 6. is a top view of an example Pancharatnam-Berry phase (PBP) grating film.

FIG. 6. is a top view of an example Pancharatnam-Berry phase (PBP) grating film 600. As shown in FIG. 6, PBP grating film 600 may be composed of an array of liquid crystal molecules of varying orientations (e.g., rotated in the two-dimensional plane in which they are portrayed). The rotation pattern of the liquid crystal molecules may repeat according to a period 604. In one example, PBP grating film 600 may serve as a diffractive optical element, such as diffractive optical element 402 in FIGS. 4 and 5.

Figure 7:
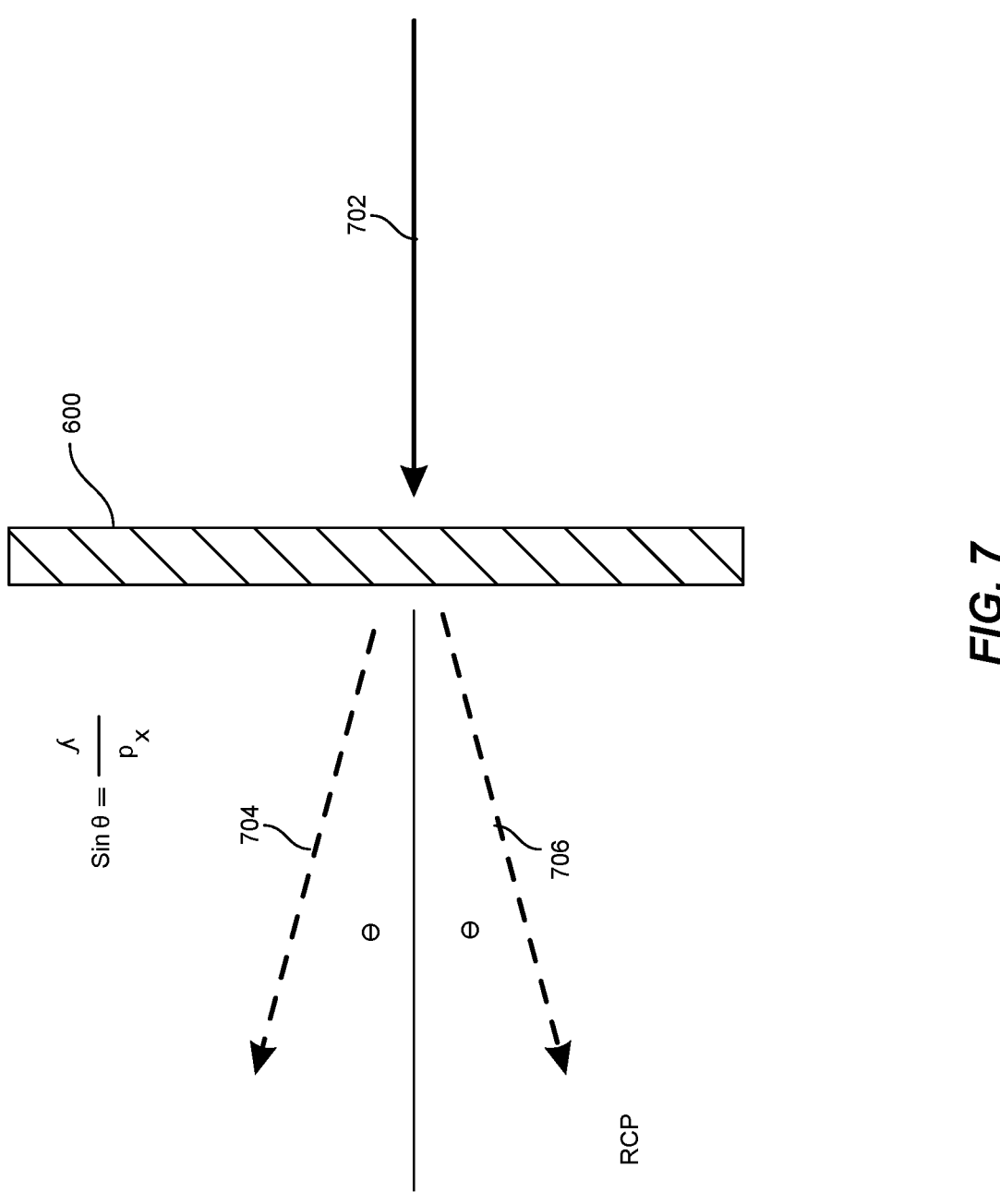
FIG. 7 is a profile view of the PBP grating film of FIG. 6.

FIG. 7 is a profile view of the PBP grating film 600 of FIG. 6. As shown in FIG. 7, linearly polarized light 702 may enter PBP grating film 600. PBP grating film 600 may diffract light 702, resulting in left circularly polarized light 704 and right circularly polarized light 706. The angle of deviation of light 704 and 706 may be expressed in Equation (1):

$$\sin\theta = \frac{\lambda}{p_x} \tag{1}$$

where $p_x$ is the periodicity of the PBP grating film 600 and A is the wavelength of light.

Figure 8:
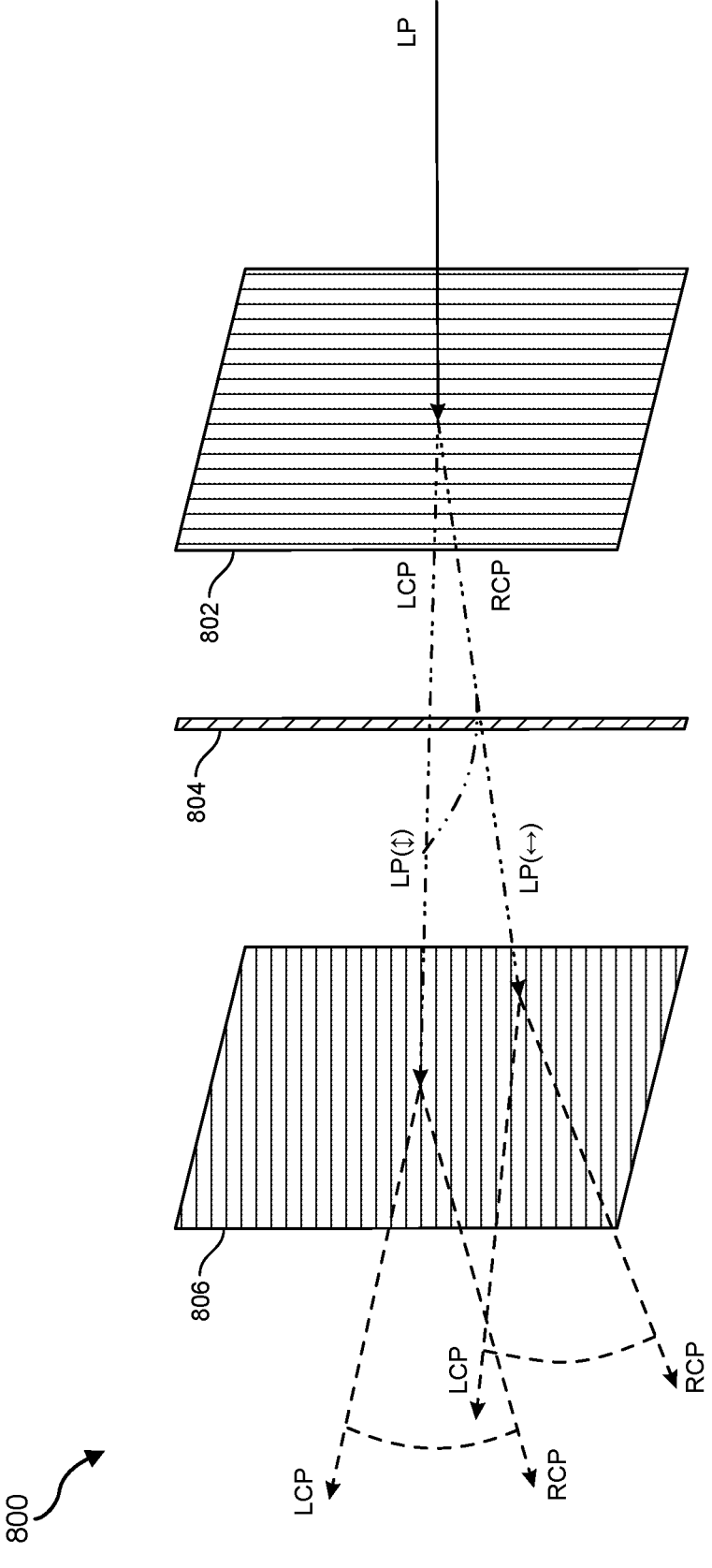
FIG. 8 illustrates an example device for fill factor expansion.

FIG. 8 illustrates an example device 800 for fill factor expansion. As shown in FIG. 8, device 800 may include a series of diffractive optical elements (i.e., a diffractive optical element 802 and a diffractive optical element 806). In one example, diffractive optical element 802 may diffract light along one dimension (e.g., horizontally, as pictured) and diffractive optical element 806 may diffract light along another dimension (e.g., vertically, as pictured). In some examples, the positions of optical elements 802 and 806 may be reversed. In some examples, optical elements 802 and 806 may be of the same (or substantially similar) design, except that optical element 806 is rotated 90 degrees with respect to optical element 802. For example, optical elements 802 and 806 may be instances of PBP grating film 600 of FIGS. 6 and 7. As shown in FIG. 8, a beam of linearly polarized (LP) light may enter optical element 802 and be diffracted into left circularly polarized (LCP) light and right circularly polarized (RCP) light. In one example, the LCP light and RCP light may pass through a quarter-wave plate 804, becoming vertically LP light and horizontally LP light, respectively, as quarter-wave plate 804 may be disposed to modulate the polarization state of the light to be input for optical element 806. The vertically LP light and horizontally LP light may each enter optical element 806 and each emerge as LCP and RCP light. Thus, the LP light may be expanded in two-dimensions by use of two diffractive optical elements that each expand the light in one dimension (e.g., in orthogonal dimensions).

Figure 9:
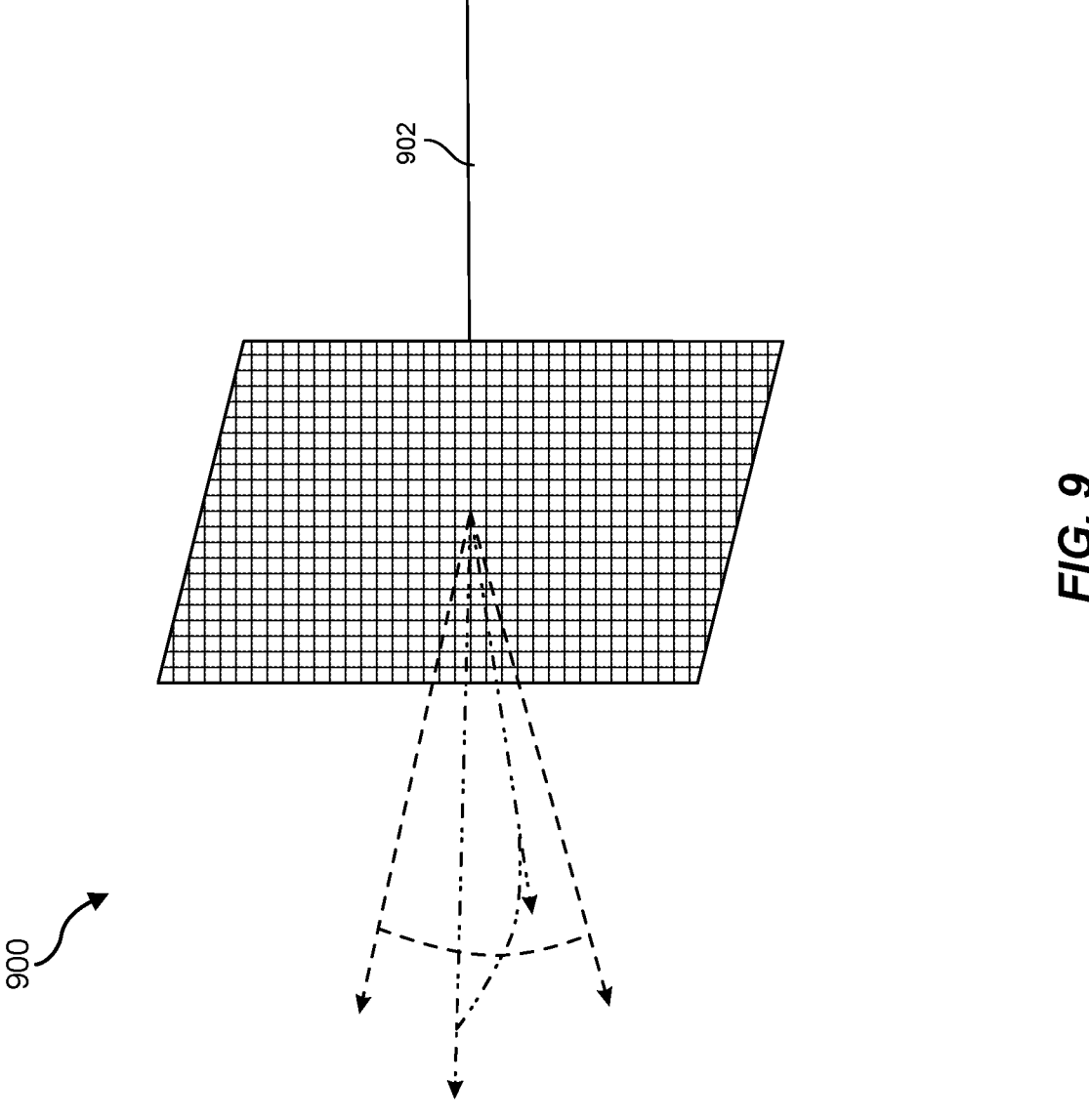
FIG. 9 illustrates a diffractive optical element that diffracts in two dimensions.

FIG. 9 illustrates a diffractive optical element 900 that diffracts in two dimensions. In one example, diffractive optical element 900 may be a PBP grating film. As shown in FIG. 9, a beam of light 902 may enter optical element 900 and emerge diffracted both horizontally and vertically.

As may be appreciated, the devices, systems, and methods described herein may use device 800 and/or diffractive optical element 900 for increasing the fill factor of displays.

Figure 10:
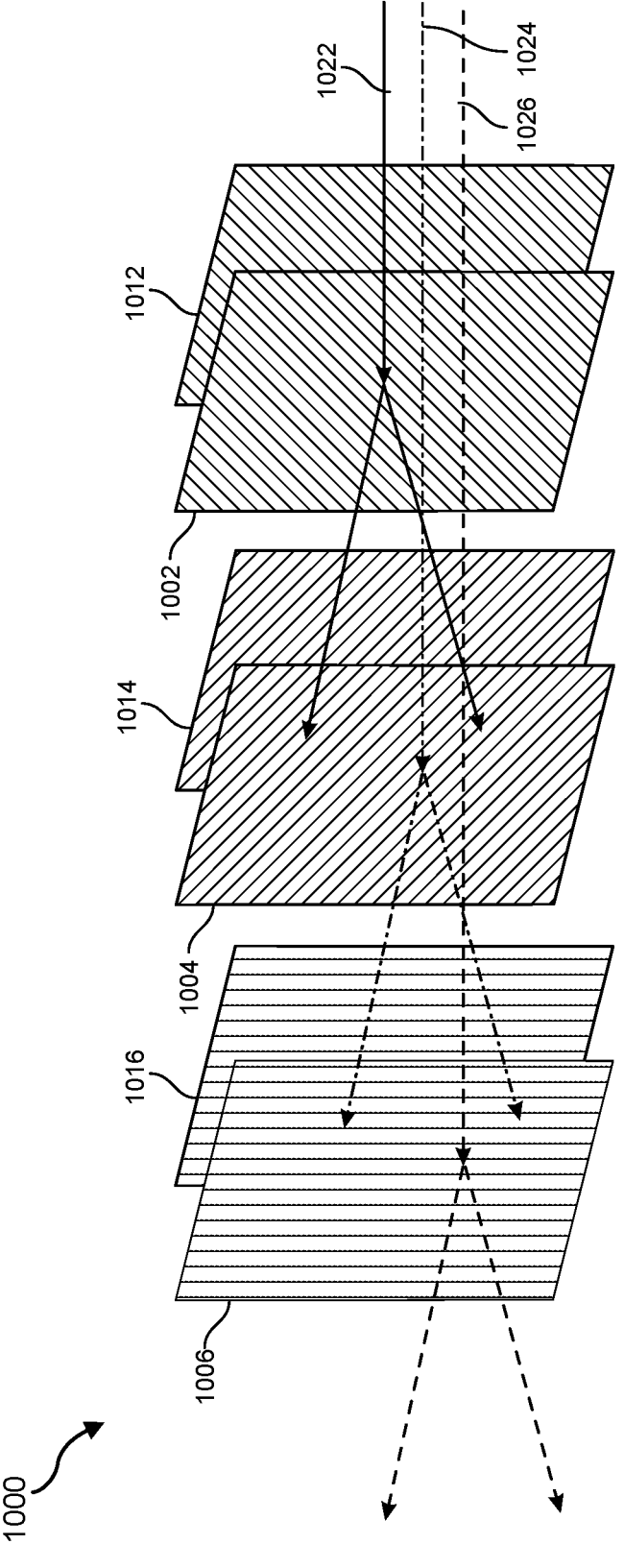
FIG. 10 illustrates a device with a series of diffractive optical elements with color-selective waveplates.

FIG. 10 illustrates a device 1000 including a series of diffractive optical elements with color-selective waveplates. As shown in FIG. 10, device 1000 may include a diffractive optical element 1002 paired with a color-selective waveplate 1012, a diffractive optical element 1004 paired with a color-selective waveplate 1014, and a diffractive optical element 1006 with a color-selective waveplate 1016. The color-selective waveplates may cause light of a corresponding color to be affected the paired diffractive optical elements while passing unaffected by the other diffractive optical elements. Thus, for example, color-selective waveplate 1012 may cause a red beam 1022 to be diffracted by diffractive optical element 1002 while a green beam 1024 and a blue beam 1026 pass unaffected by optical element 1002. Likewise, color-selective waveplate 1014 may cause green beam 1024 to be diffracted by optical element 1004 while the diffracted beams of red beam 1022 and blue beam 1026 pass unaffected by optical element 1004. Similarly, color-selective waveplate 1016 may cause blue beam 1026 to be diffracted by optical element 1006 while the diffracted beams of red beam 1022 and the diffracted beams of green beam 1024 pass unaffected.

In one example, the placement and/or design of diffractive optical elements 1002, 1004, and 1006 may be such that red beam 1022, green beam 1024, and blue beam 1026 are expanded by the same amount by the time they reach a user's eye. Generally, the placement and/or design of diffractive optical elements 1002, 1004, and 1006 may be such that the respective colors are expanded by a target amount by the time they reach a user's eye.

In one example, diffractive optical elements may be PBP grating films. Thus, because PBP grating films may diffract different wavelengths to different degrees (e.g., longer wavelengths, such as red light, more than shorter wavelengths, such as blue light), each PBP grating film may have a different design according to its corresponding color. Thus, for example, the periodicity of liquid crystal rotations in each PBP grating film may be set in proportion to the wavelength of light that the PBP grating film diffracts.

FIG. 11 illustrates an example fill factor increase 1100 of example pixel 108. As shown in FIG. 11, apparatuses and systems described herein may create an effective subpixel image 1102 from subpixel 102, an effective subpixel image 1104 from subpixel 104, and an effective subpixel image 1106 from subpixel 106, resulting in an effective pixel image 1108. For example, as mentioned earlier, subpixels 102, 104, and 106 may emit light of different wavelengths. However, an apparatus that selectively diffracts different colors (such as, e.g., device 1000 of FIG. 1) may ensure that different wavelengths are dispersed the same amount. Accordingly, in one example, subpixels 102, 104, and 106 may be equally expanded and leave less gap between subpixels (or, e.g., between pixels) than is shown in pixel image 208 of FIG. 2.

Because subpixel images 1102, 1104, and 1106 leave less (or no) gap area between each other and between themselves and adjacent pixels, the screen-door effect may be mitigated and/or eliminated to a user's perception.

FIGS. 12A and 12B illustrate example placements of diffractive optical elements (e.g., PBP gratings) in display systems for increased fill factor. As shown in FIG. 12A, a display system 1200 may include a diffractive optical element placed adjacent to a lens 1206, on a side of a user's eye 1204 at a location 1220 or on a side of a display 1208 at a location 1222. In these examples, the diffractive optical element (e.g., a film), may be coupled to (e.g., laminated to) lens 1206. In another example, the diffractive optical element may be placed between lens 1206 and display 1208 (e.g., at a location 1224). In another example, the diffractive optical element may be placed adjacent to display 1208 at a location 1226. In this example, the diffractive optical element may be coupled to (e.g., laminated to) display 1208.

As shown in FIG. 12B, a display system 1202 may include multiple lenses—e.g., a lens 1214 and a lens 1216. In some examples, lenses 1214 and 1216 may together form a compound lens. Additionally or alternatively, lenses 1214 and 1216 may together form a part of a pancake lens. In some examples, lenses 1214 and 1216 may be a part of a more complex optical stack with other elements that are not pictured. In some examples, display system 1202 may include a diffractive optical element placed adjacent to lens 1216, on a side of user's eye 1204 at a location 1230 or between lenses 1216 and 1214 at a location 1232. In some examples, display system 1202 may include a diffractive optical element placed adjacent to lens 1214, on a side of display 1208 at a location 1234 or between lenses 1216 and 1214 at a location 1232. In these examples, the diffractive optical element (e.g., a film), may be coupled to (e.g., laminated to) either side of lens 1216 and/or lens 1214. In another example, the diffractive optical element may be placed between lens 1214 and display 1208 (e.g., at a location 1236). In another example, the diffractive optical element may be placed adjacent to display 1208 at a location 1238. In this example, the diffractive optical element may be coupled to (e.g., laminated to) display 1208.

In some examples, a method of manufacture for a display system with increased fill factor may include positioning a lens to magnify a display and positioning a diffractive optical element to increase a fill factor of the display when the lens is used to magnify the display. Thus, referring to FIG. 12A by way of example, lens 1206 may be positioned to magnify display 1208 to a user's eye 1204. A diffractive optical element may also be positioned in relation to lens 1206, display 1208, and a target position of user's eye 1204 to increase the fill factor of display 1208 (e.g., of the pixels and/or subpixels of display 1208) within display system 1200.

While some of the examples described herein relate to increasing a fill factor (e.g., the proportion of display area that is lit, rather than dark gap between subpixels and/or pixels) to 100%, in some examples the devices and systems described herein may target a fill factor of less than 100%. Depending on the specific display and/or the use case (e.g., text, images, video, three-dimensional environment, etc.), a fill factor of less than 100% may provide a better subjective perception experience than a fill factor of 100%. Thus, in some examples the fill factor may be selected based on the specific display and/or the use case. Accordingly, the devices and systems described herein may provide a variety of fill factors. Examples of fill factors of the devices and systems described herein include, without limitation, 100%, between 99% and 100%, between 95% and 99%, between 90% and 95%, between 35% and 90%, between 45% and 80%, between 55% and 75%, and between 60% and 70%. In some examples, a display may be designed with a subpixel structure based on a target fill factor (i.e., with the expectation that the images of one or more subpixels will be duplicated by one or more of the devices and systems described herein) and/or an expected use case.

Embodiments of the present disclosure may include or be implemented in conjunction with various types of artificial-reality systems. Artificial reality may be a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality device 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on shoulders than they would tolerate on heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(I) and 1320(J)) that are part of the microphone array (or potentially form own microphone subarray). Neckband 1305 may also include a controller 1325 and a power source 1335.

Acoustic transducers 1320(I) and 1320(J) of neckband 1305 may be configured to detect sound and convert the detected sound into an electronic format (analog or digital). In the embodiment of FIG. 13, acoustic transducers 1320(I) and 1320(J) may be positioned on neckband 1305, thereby increasing the distance between the neckband acoustic transducers 1320(I) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium-ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising a diffractive optical element, wherein the diffractive optical element is configured to increase a fill factor of a display when a lens is used to magnify the display, wherein the diffractive optical element comprises at least one Pancharatnam-Berry phase grating, wherein the at least one Pancharatnam-Berry phase grating comprises at least one one-dimensional Pancharatnam-Berry phase grating, and wherein the at least one one-dimensional Pancharatnam-Berry phase grating comprises:

a first one-dimensional Pancharatnam-Berry phase grating that diffracts light along a first dimension; and a second one-dimensional Pancharatnam-Berry phase grating that diffracts light along a second dimension orthogonal to the first dimension.

2. The apparatus of claim 1, further comprising at least one waveplate disposed to modulate a polarization state of input light to the at least one Pancharatnam-Berry phase grating.

3. The apparatus of claim 1, wherein the at least one Pancharatnam-Berry phase grating comprises at least one two-dimensional Pancharatnam-Berry phase grating.

4. The apparatus of claim 1, wherein the diffractive optical element is configured to be positioned adjacent to the display.

5. The apparatus of claim 1, wherein the diffractive optical element is configured to be positioned adjacent to the lens.

6. The apparatus of claim 1, further comprising at least one color-selective waveplate that controls what color is affected by the diffractive optical element.

7. The apparatus of claim 1, wherein the diffractive optical element comprises a film.

8. A system comprising:

a display;

a lens; and a diffractive optical element, wherein the diffractive optical element is configured to increase a fill factor of the display when the lens is used to magnify the display, wherein the diffractive optical element comprises at least one Pancharatnam-Berry phase grating, wherein the at least one Pancharatnam-Berry phase grating comprises at least one one-dimensional Pancharatnam-Berry phase grating, and wherein the at least one one-dimensional Pancharatnam-Berry phase grating comprises:

a first one-dimensional Pancharatnam-Berry phase grating that diffracts light along a first dimension; and a second one-dimensional Pancharatnam-Berry phase grating that diffracts light along a second dimension orthogonal to the first dimension.

9. The system of claim 8, further comprising at least one waveplate disposed to modulate a polarization state of input light to the at least one Pancharatnam-Berry phase grating.

10. The system of claim 8, wherein the at least one Pancharatnam-Berry phase grating comprises at least one two-dimensional Pancharatnam-Berry phase grating.

11. The system of claim 8, wherein the diffractive optical element is configured to be positioned adjacent to the display.

12. The system of claim 8, wherein the diffractive optical element is configured to be positioned adjacent to the lens.

13. The system of claim 8, further comprising at least one color-selective waveplate that controls what color is affected by the diffractive optical element.

14. A method of manufacture comprising:

positioning a lens to magnify a display; and positioning a diffractive optical element to increase a fill factor of the display when the lens is used to magnify the display, wherein the diffractive optical element comprises at least one Pancharatnam-Berry phase grating, wherein the at least one Pancharatnam-Berry phase grating comprises at least one one-dimensional Pancharatnam-Berry phase grating, and wherein the at least one one-dimensional Pancharatnam-Berry phase grating comprises:

a first one-dimensional Pancharatnam-Berry phase grating that diffracts light along a first dimension; and a second one-dimensional Pancharatnam-Berry phase grating that diffracts light along a second dimension orthogonal to the first dimension.

* * * * *